US008588417B2

(12) United States Patent
Wentink

(10) Patent No.: US 8,588,417 B2
(45) Date of Patent: Nov. 19, 2013

(54) SYSTEMS AND METHODS FOR MULTICAST RETRANSMISSION OVER A SECURE WIRELESS LAN

(75) Inventor: Maarten Menzo Wentink, Utrecht (NL)

(73) Assignee: Conexant Systems, Inc., Irvine, CA (US)

( * ) Notice: Subject to any disclaimer, the term of this patent is extended or adjusted under 35 U.S.C. 154(b) by 731 days.

(21) Appl. No.: 12/106,260

(22) Filed: Apr. 18, 2008

(65) Prior Publication Data
US 2008/0273700 A1 Nov. 6, 2008

Related U.S. Application Data

(60) Provisional application No. 60/927,697, filed on May 4, 2007.

(51) Int. Cl.
H04K 1/00 (2006.01)
H04L 29/06 (2006.01)

(52) U.S. Cl.
USPC ........... 380/270; 713/160; 713/161; 713/162; 713/163

(58) Field of Classification Search
USPC .................. 380/370, 270; 713/160–163
See application file for complete search history.

(56) References Cited

U.S. PATENT DOCUMENTS

| 6,522,650 | B1 * | 2/2003 | Yonge et al. | 370/390 |
|---|---|---|---|---|
| 6,693,907 | B1 * | 2/2004 | Wesley et al. | 370/390 |
| 7,251,235 | B2 | 7/2007 | Wentink | |
| 7,408,931 | B2 | 8/2008 | LoGalbo et al. | |
| 7,545,771 | B2 | 6/2009 | Wentink et al. | |
| 7,631,070 | B2 | 12/2009 | Lewis | |
| 7,698,550 | B2 | 4/2010 | Abhishek et al. | |
| 7,710,934 | B2 | 5/2010 | Cho | |
| 2005/0160345 | A1 | 7/2005 | Walsh et al. | |
| 2006/0140186 | A1 | 6/2006 | LoGalbo et al. | |
| 2007/0286121 | A1 | 12/2007 | Kolakowski et al. | |
| 2008/0192661 | A1 | 8/2008 | Hamamoto et al. | |
| 2010/0153807 | A1 * | 6/2010 | Kakani | 714/749 |

OTHER PUBLICATIONS

Gast, M., "Counter Mode with BCB-MAC (CCMP)," 802.11 Wireless Networks, O'Reilly Media Inc., Apr. 2005, pp. 14-16 and 159-163.*
LAN/MAN Standards Committee, "Part 11: Wireless LAN Medium Access Control (MAC) and Physical Layer (PHY) Specifications", IEEE Standard for Information Technology—Telecommunications and Information Exchange Between Systems—Local and Metropolitan Area Networks—Specific Requirements, Jun. 12, 2007, pp. 1-1232, IEEE Std 802.11-2007, Revision of IEEE Std 802.11-1999, IEEE, New York, New York, United States of America.

* cited by examiner

Primary Examiner — Carl Colin
Assistant Examiner — John Elmore
(74) Attorney, Agent, or Firm — Farjami & Farjami LLP

(57) ABSTRACT

Systems and methods for broadcast and multicast retransmissions within a protected wireless communications system are described. Retransmitted broadcast or multicast frames are designated by modification of fields or subfields in the MAC header of the frame which are constituent parts of the additional authentication data used to generate encryption keys. Such modifications cause legacy receivers to disregard the retransmitted frames or render legacy receivers to be unable to decrypt the retransmitted frame, avoiding the generation of duplicate frames. Non-legacy receivers recognizing the modification conventions can restore the MAC header to the original state and can reconstruct the original encryption keys and decrypt the retransmitted frames. A non-legacy transmitter can retransmit a frame without the need to re-encrypt the frame.

21 Claims, 6 Drawing Sheets

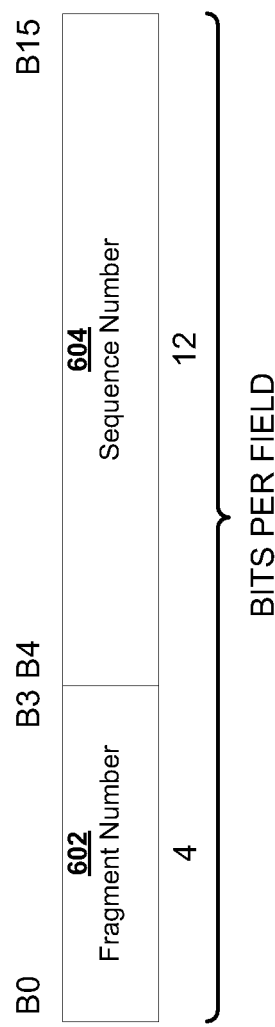

SYSTEMS AND METHODS FOR MULTICAST RETRANSMISSION OVER A SECURE WIRELESS LAN

CROSS-REFERENCE TO RELATED APPLICATION

Under 35 U.S.C. 119, this application claims priority to, and the benefit of, U.S. Provisional Patent Application entitled, "Multicast Retransmissions," having Ser. No. 60/927,697, filed on May 4, 2007, which is incorporated by reference in its entirety.

BACKGROUND OF THE INVENTION

1. Field of the Invention

The present disclosure generally relates to wireless communications and more particularly relates to systems and methods for retransmission of multicast traffic over a secure wireless local area network (WLAN).

2. Background Information

Among other things, FIG. 1 illustrates a typical network configuration for communicating data between stations via an access point in a WLAN or 802.11-based network. As illustrated in the non-limiting example of FIG. 1, a network 140 may be coupled to access point 130. In some embodiments, the network 140 may be the Internet, for example. Access point 130 can be configured to provide wireless communications to various wireless devices or stations 110, 120, 124. Depending on the particular configuration, the stations 110, 120, 124 may be a personal computer, a laptop computer, a mobile phone, a personal digital assistant (PDA), and/or other device configured for wirelessly sending and/or receiving data. Furthermore, access point 130 may be configured to provide a variety of wireless communications services, including but not limited to: Wireless Fidelity (WIFI) services, Worldwide Interoperability for Microwave Access (WiMAX) services, and wireless session initiation protocol (SIP) services. Furthermore, the stations 110, 120, 124 may be configured for WIFI communications (including, but not limited to 802.11, 802.11b, 802.11a/b, 802.11g, and/or 802.11n).

Access point 130 can transmit to a single station such as station 110 which is known as a unicast transmission. Access point 130 can also transmit to all stations which is known as a broadcast transmission. Access point 130 can also transmit to a subset of all stations which is known as multicast transmissions. In broadcast and multicast (collectively referred to as BM), a receiver may be an endpoint where it simply receives a BM transmission or it may be responsible for relaying the transmission to the next stage (e.g. an access point).

In the past, BM transmissions in wireless networks and in particular 802.11 WIFI networks are transmitted once, without retries. The primary reason for the lack of retries in BM transmissions is that there is no mechanism by which receivers can indicate whether a BM frame was received or not.

Recently, there have been discussions and proposals that would introduce retries into BM transmissions. One difficulty arises due to the absence of retries in older system's legacy receivers (either stations or access point). There was no mechanism by which receivers can indicate whether a frame was received or not. Because a legacy receiver will be unable to determine whether a BM transmission is a retry, legacy receivers will likely assume the BM transmission is a new transmission. The legacy receiver having the belief there are no retries for BM transmissions will assume the current BM transmission is a new BM transmission resulting in the generation of duplicate frames through the media access control (MAC) service access point where higher level protocol in the network protocol stack will see duplicates, resulting in the end application on the station seeing duplicate frames, which is highly undesirable.

One prior proposed solution is to modify the destination address or the basic service set identification (BSSID) of the retried BM frame in such a way that a legacy receiver would simply ignore the BM frame as not designated for it. The approach can work in general, but in a protected environment where all data frames are encrypted, there is a serious drawback. Because fields such as the destination address and BSSID are included in the additional authentication data (AAD), a change in these fields can cause the AAD to change. The AAD is used to determine the encryption key. A change in any field in the AAD will yield a different encryption key. As a result in order for the retried BM frame to be viable, the frame body would have to be re-encrypted using the modified encryption key. The additional encryption can be costly in terms of processor resources. Accordingly, various needs exist in the industry to address the aforementioned deficiencies and inadequacies.

SUMMARY OF INVENTION

In order to prevent legacy systems in an encrypted environment from seeing duplicate multicast transmissions without the need to re-encrypt multicast retransmissions, a modification to MAC header fields, which are used to create AAD are made. The modifications to the MAC header fields of a retransmitted frame render legacy systems incapable of decrypting the retransmission and hence they discard them. In addition to a modification to the MAC header, the retry bit of the frame control field of a frame is also set as an additional indicator of a retransmission. Modifications can be made to the various MAC addresses included in the MAC header, in particular, the setting of the locally administered bit. A non-legacy station can then reverse the modification and decrypt the retransmitted frame, if necessary. The non-legacy station can also determine whether it has already received the retransmitted frame and discard it if it has.

Access points and stations comprising a processor, network interfaces and a memory can be configured to interoperate with the methods and variations described above by implementing additional logical modules as instructions in the memory. The logic can then be carried out by the processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 shows the further breakdown of the sequence control field;

FIG. 7 shows the composition of the AAD; and

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
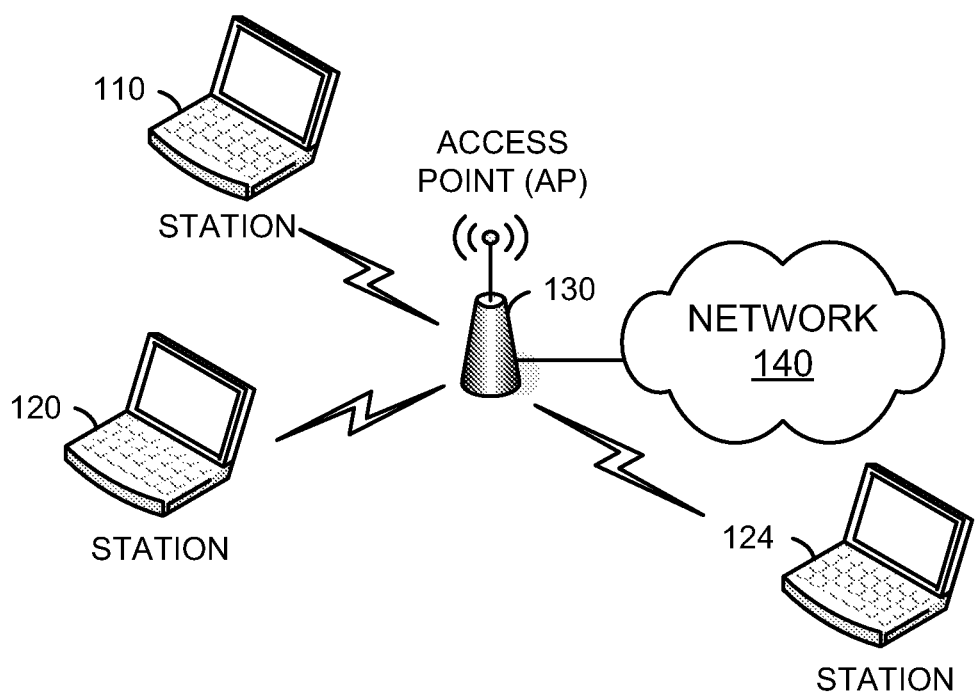
FIG. 1 illustrates a typical network configuration for communicating data between stations via an access point in a WLAN or 802.11-based network.
Figure 2:
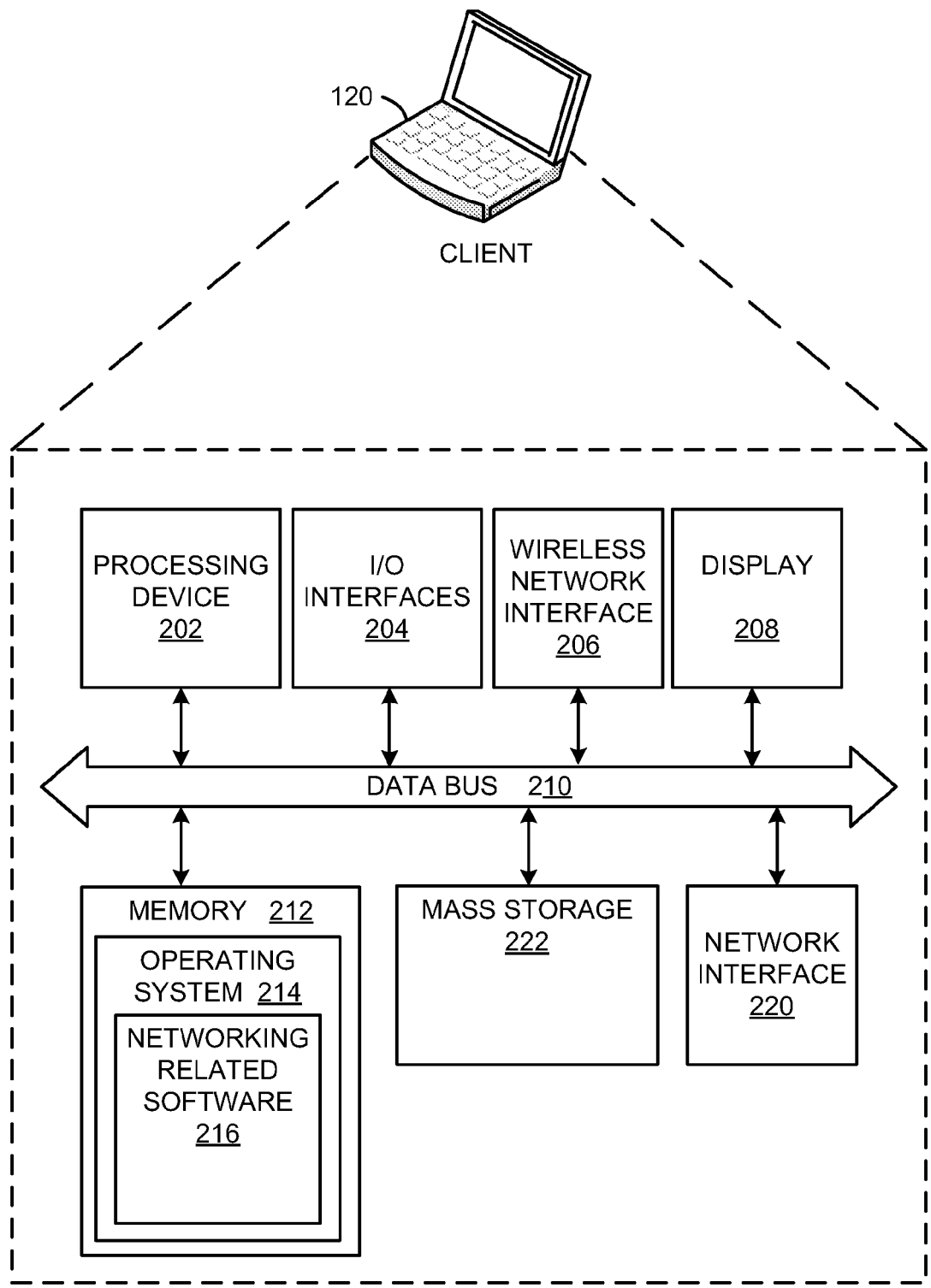
FIG. 2 illustrates an embodiment of one of the wireless devices/stations shown in FIG. 1.

FIG. 2 illustrates an embodiment of one of the wireless devices/stations shown in FIG. 1. It can be configured to receive and process messages as disclosed below. Generally speaking, station 120 can comprise any one of a wide variety of wireless computing devices, such as a desktop computer, portable computer, dedicated server computer, multiprocessor computing device, cellular telephone, PDA, handheld or pen based computer, embedded appliance and so forth. Irrespective of its specific arrangement, station 120 can, for instance, comprise memory 212, processing device 202, a number of input/output interfaces 204, wireless network interface device 206, display 208, and mass storage 222, wherein each of these devices is connected across one or more data buses 210. Optionally, station 120 can also comprise a network interface device 220 also connected across one or more data buses 210.

Processing device 202 can include any custom made or commercially available processor, a central processing unit (CPU) or an auxiliary processor among several processors associated with the computing device 120, a semiconductor based microprocessor (in the form of a microchip), a macroprocessor, one or more application specific integrated circuits (ASICs), a plurality of suitably configured digital logic gates, or generally any device for executing instructions.

Input/output interfaces 204 provide any number of interfaces for the input and output of data. For example, where station 120 comprises a personal computer, these components may interface with user input device 204, which may be a keyboard or a mouse. Where station 120 comprises a handheld device (e.g., PDA, mobile telephone), these components may interface with function keys or buttons, a touch sensitive screen, a stylist, etc. Display 208 can comprise a computer monitor or a plasma screen for a personal computer (PC) or a liquid crystal display (LCD) on a hand held device, for example.

Wireless network interface device 206 and optionally network interface device 220 comprise various components used to transmit and/or receive data over a network environment. By way of example, these may include a device that can communicate with both inputs and outputs, for instance, a modulator/demodulator (e.g., a modem), wireless (e.g., radio frequency (RF)) transceiver, a telephonic interface, a bridge, a router, network card, etc. Station 120 can use wireless network interface device 206 to communicate with access point 130.

With further reference to FIG. 2, memory 212 can include any one of a combination of volatile memory elements (e.g., random-access memory (RAM), such as DRAM, SRAM, etc.) and nonvolatile memory elements (e.g., flash, read only memory (ROM), nonvolatile RAM, etc.). Mass storage 222 can also include nonvolatile memory elements (e.g., flash, hard drive, tape, CDROM, etc.). Memory 212 comprises software which may include one or more separate programs, each of which includes an ordered listing of executable instructions for implementing logical functions. Often, the executable code can be loaded from nonvolatile memory elements including from components of memory 212 and mass storage 222. Specifically, the software can include native operating system 214, one or more native applications, emulation systems, or emulated applications for any of a variety of operating systems and/or emulated hardware platforms, emulated operating systems, etc. These may further include networking related software 216 which can further comprise a communications protocol stack comprising a physical layer, a link layer, a network layer and a transport layer. Network related software 216 can be used by processing device 202 to communicate with access point 130 through wireless network interface 206 and can further include logic which causes the processor to reverse a known alteration to MAC header fields used in the AAD, where the alterations are made by access point 130 during broadcast or multicast retransmissions. The logic can further determine whether a broadcast or multicast frame is a retransmission and discard it if it has already been received. It should be noted, however, that the logic for performing these processes can also be implemented in hardware or a combination of software and hardware. One of ordinary skill in the art will appreciate that the memory 212 can, and typically will, comprise other components which have been omitted for purposes of brevity.

Figure 3:
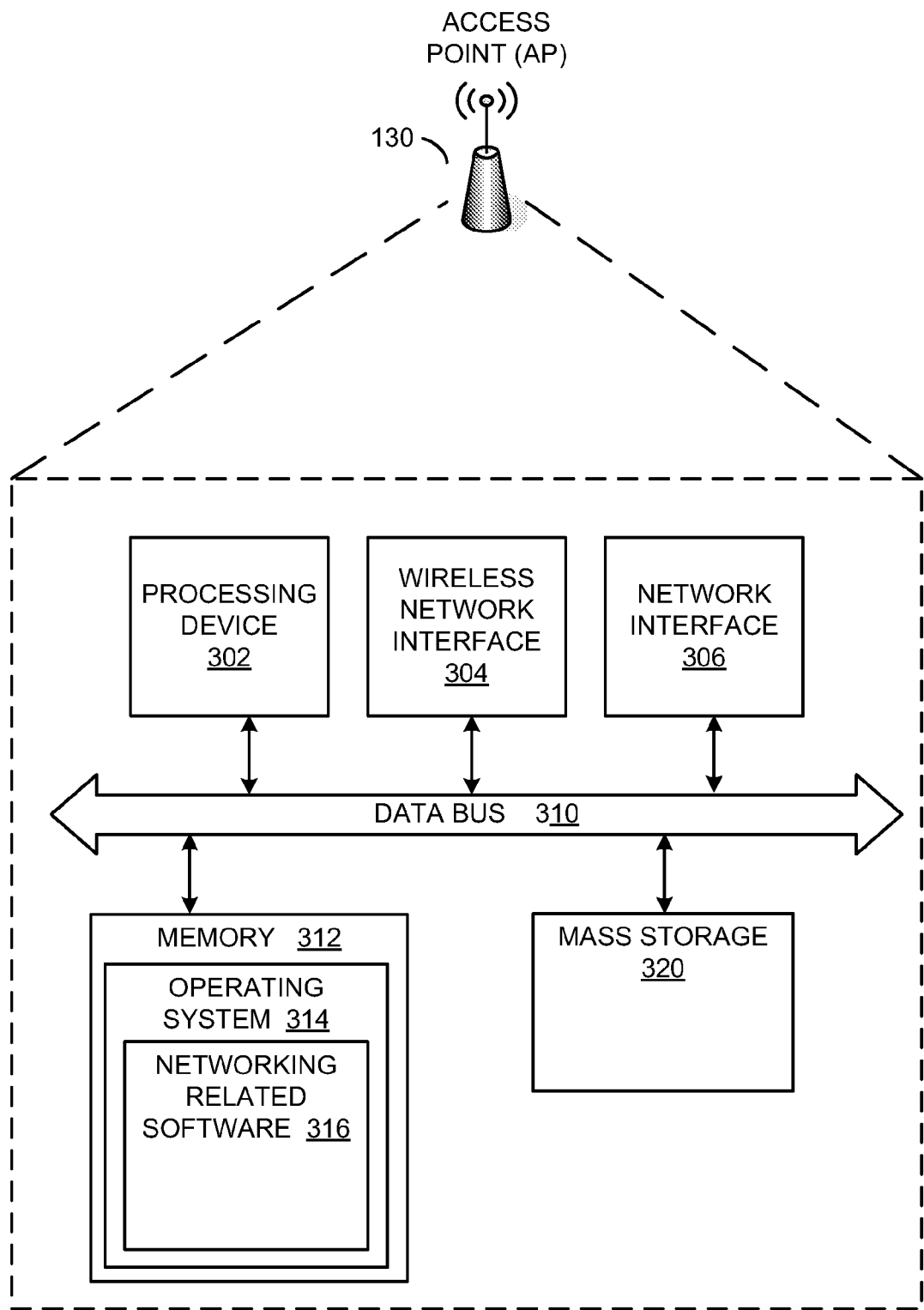
FIG. 3 illustrates an embodiment of the access point shown in FIG. 1.

FIG. 3 illustrates an embodiment of an access point as shown in FIG. 1. It can be configured to receive and process messages as disclosed below. Generally speaking, station 120 can comprise any one of a wide variety of network functions, including network address translation (NAT), routing, dynamic host configuration protocol (DHCP), domain name services (DNS) and firewall functions. Irrespective of its specific arrangement, the stations 120 can, for instance, comprise memory 312, a processing device 302, wireless network interface 304, network interface device 306, and nonvolatile storage 324, wherein each of these devices is connected across one or more data buses 310.

Processing device 302 can include any custom made or commercially available processor, a CPU or an auxiliary processor among several processors associated with access point 130, a semiconductor based microprocessor (in the form of a microchip), a macroprocessor, one or more ASICs, a plurality of suitably configured digital logic gates, or generally any device for executing instructions.

Wireless network interface device 304 and network interface device 306 comprise various components used to transmit and/or receive data over a network environment. By way of example, either interface may include a device that can communicate with both inputs and outputs, for instance, a modulator/demodulator (e.g., a modem), wireless (e.g., RF) transceiver, a telephonic interface, a bridge, a router, network card, etc. Access point 130 typically uses wireless network interface device 304 to communicate with nearby stations and network interface device 306 to communicate with network 140. In some implementation, the two devices can be combined into one physical unit.

With further reference to FIG. 3, memory 312 can include any one of a combination of volatile memory elements (e.g., RAM, such as DRAM, SRAM, etc.) and nonvolatile memory elements (e.g., flash, ROM, nonvolatile RAM, hard drive, tape, CDROM, etc.). Memory 312 comprises software which may include one or more separate programs, each of which includes an ordered listing of executable instructions for implementing logical functions. Often, the executable code and persistent configuration parameters can be loaded from nonvolatile memory elements including from components of memory 312. Specifically, the software can include native operating system 314, one or more native applications, emulation systems, or emulated applications for any of a variety of operating systems and/or emulated hardware platforms, emulated operating systems, etc. These may further include networking related software 322 which can further comprise a communications protocol stack comprising a physical layer, a link layer, a network layer and a transport layer. These may further include networking related software 316 which can further comprise a communications protocol stack comprising a physical layer, a link layer, a network layer and a transport layer. Network related software 316 can be used by processing device 302 to communicate with access point 130 through wireless network interface 306 and can further include logic that causes the processor to alter the MAC header of a broadcast or multicast frame when it is retransmitted, where the alteration is made to some of the fields used as the AAD, thereby preventing legacy stations from being able to decrypt the retransmitted frame. More specifically, the logic can alter specific MAC address within the MAC header including alteration by setting the locally administered bit. In particular, the software can receive a wakeup instruction from the access point even in a protected wireless network. It should be noted, however, that the logic for performing these processes can also be implemented in hardware or a combination of software and hardware. One of ordinary skill in the art will appreciate that the memory 312 can, and typically will, comprise other components which have been omitted for purposes of brevity.

Figure 4:
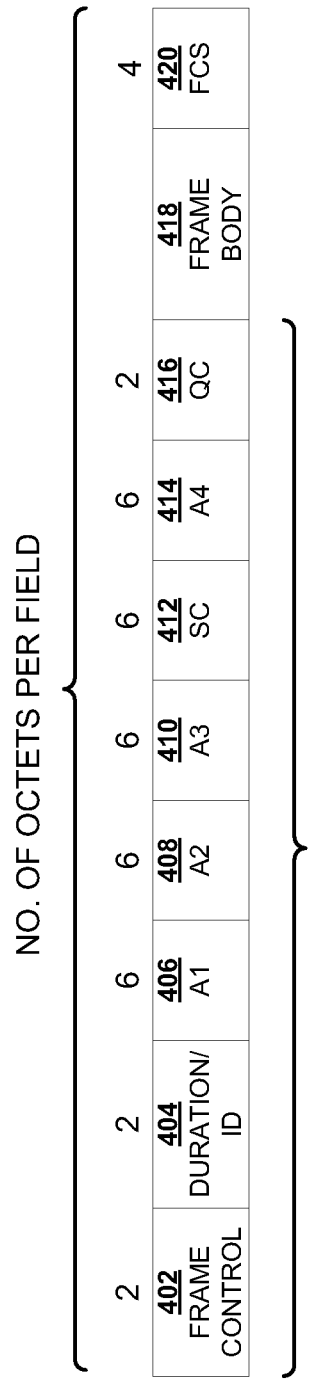
FIG. 4 shows the format for a data frame.

FIG. 4 shows the format for a data frame. Fields 402, 404, 406, 408, 410, 412, 414 and 416 are collectively referred to as the MAC header. Frame control field 402 is a two octet fixed field indicative of properties of the frame as defined by the particular standard. It comprises a bit which when set indicates the frame is protected. Duration/ID field 404 is a two octet fixed field which comprises either duration information or identification information depending on the frame use as defined by the particular standard. Address fields 406, 408, 410, and 414 are used to specify various address parameters. Typically in a multicast or broadcast application, address field 406 which is the receiver address is set to a multicast or broadcast address. Address field 408 which is the transmitter address is usually set to the BSSID when transmitted by the access point. Address field 410 is the source address, which is set to the MAC address of the source of the frame. Address field 414 is optional and is not used in a typical multicast or broadcast application. Sequence control field 412 is a two octet fixed field which comprises a fragment number and a sequence number. The fragment number is used when a frame is fragmented to keep track of the fragments. The sequence number is incremented each time a station transmits a message. Quality of service (QoS) control field 416 is a two octet field used to carry QoS parameters.

After the MAC header, the data frame includes frame body 418 which contains the payload. Frame body 418 is encrypted as specified by the standard if the frame is protected. Finally, frame check sequence field 420 is a four octet fixed field indicative of the integrity of the frame. The specific integrity check is specified by the standard, but as an example, some standards use a cyclic redundancy code (CRC).

Figure 5:
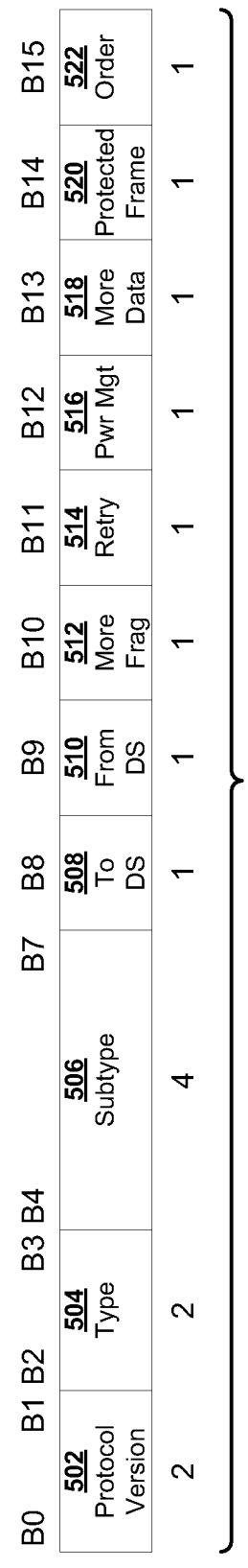
FIG. 5 shows a further breakdown of the frame control field.

FIG. 5 shows a further breakdown of the frame control field. Protocol version subfield 502 is a two bit subfield and is indicative of the version of the standard being used. A device that receives a frame with a higher revision level than it supports will discard the frame without indication to the sender. Type subfield 504 is a two bit subfield and is indicative of the frame type, control, data and management. Subtype subfield 506 is a four bit subfield and further identifies the function of each frame. The number of subtypes is numerous and can be found in any of the relevant standards. "To DS" subfield 508 and "from DS" subfield 510 are each one bit subfield. They indicate whether the frame is destined for the distribution system (DS) or exiting the DS, respectively. Generally, the access point is the access point to the DS. There are various meanings to the various combinations which can readily be found in the appropriate standards.

More Fragments subfield 512 is a one bit subfield and is set to 1 in all data or management type frames that have another fragment to follow. It is set to 0 in all other frames. Retry subfield 514 is a one bit subfield and is set to 1 in any data or management type frame that is a retransmission of an earlier frame. It is set to 0 in all other frames. A receiver uses this indication to aid in the process of eliminating duplicate frames. Power management subfield 516 is a one bit subfield and is used to indicate the power management mode of a station. A value of one indicates that the station will be in power-save mode after the completion of the current frame exchange. A value of zero indicates that the station will be in active mode. This subfield is always set to zero in frames transmitted by an access point. More data 518 subfield is a one bit subfield and is used to indicate to a station in standby that there is more data buffered for that station. In general it is used to indicate that there are more frames in a given burst. The specific use may vary depending on the type of transmission. The frames can be unicast or multicast data and can be data or management frames. Protected Frame subfield 520 is a one bit subfield and is set to one if the frame body field contains information that has been processed by a cryptographic encapsulation algorithm. It is set to zero all other times. Order subfield 522 is a one bit subfield and is set to one in any data type frame which is being transferred using the StrictlyOrdered service class, as defined in the specific standard, (e.g. 802.11). This subfield is set to zero in all other frames.

FIG. 6 shows the further breakdown of the sequence control field. Sequence number subfield 604 is a 12-bit subfield indicating the sequence number of a message. Each message transmitted by a station or access point is assigned a sequence number. Should a message be fragmented, each frame containing a fragment is assigned the same sequence number for that message. Fragment number subfield 602 is a 4-bit subfield indicating the number of each fragment of a message. The fragment number is set to zero in the first or only fragment of a message and is incremented by one for each successive fragment of that message.

The QoS control field is typically more complicated and not present in all wireless standards. Examples of QoS control field can be found in the 802.11e standard.

The encryption of frame body 418 is based on the AAD derived from values within the MAC header. Duration/ID field 404 is not used, but portions of all other fields are used. FIG. 7 shows the composition of the AAD. The AAD comprises frame control field 402, but bits 4-6, 11-13 are set to zero and bit 14 (protected frame bit) is set to one in the derivation of the AAD. The AAD further comprises address fields 406, 408 and 410. The AAD also includes sequence control field 412 where the sequence number which occupies bits 4-15 are set to zero. In the event optional address field 412 is present in the MAC header, address field 412 is included in the AAD. Finally, if QoS control field 414 is present in the MAC header, QoS control field 416 is included in the AAD with bits 4-15 set to zero. The purpose of setting some bits to zero is that many values are set after encryption or that they will change between two identical messages, e.g. the sequence number subfield of sequence control field 412.

It should be noted that since bit 11 of the frame control (retry subfield 514) is set to zero, it is tempting to use the retry subfield to indicate that a BM frame is a retransmission, and for current systems this method is the appropriate way. Because it is set to zero, it does not factor into the construction of the AAD, so a legacy system does not have to re-encrypt the frame for a retransmission. However, it is very likely that at least some legacy systems do not implement duplicate detection for BM frames because retransmissions would never occur.

A method to generate a retransmitted BM frame, where legacy receivers will not generate duplications and the retransmitted frame BM frame need not be re-encrypted and can still be decrypted by a non-legacy receiver, relies on modifications to the MAC header. A retransmitted BM frame can be characterized by the broadcast bit (bit 8 of the first octet) in receiver address 406 and by setting the retry subfield in frame control field 402. When a BM frame is retransmitted, additional fields in the MAC header are modified. Upon receiving the BM frame, the non-legacy receiver recognizes the frame as a BM retransmitted frame and restores the modified MAC header to its state prior to modification. Using the pre-modified MAC header, the receiver can reconstruct the AAD and hence the encryption key of the original (non-retransmitted) frame. Since the frame bodies are the same between the original frame and the retransmitted frame, the receiver can decrypt it. On the other hand, if a legacy receiver receives the retransmitted BM frame, it either disregards the frame because the modification to the MAC header causes the receiver to believe it should not receive the frame (e.g., no longer addressed to the receiver), or the receiver being a legacy receiver has no knowledge that the MAC header modification will construct an AAD based on the modified MAC header and derive an incorrect encryption key. With a bad encryption key, the legacy receiver will be unable to decrypt the frame body and will discard the frame, thereby preventing the legacy system from generating a duplicate.

One modification is to modify the BSSID in transmitter address field 408. The modifications can be established through a standard or convention. Another modification is to modify the receiver address field 406. The source address field 410 which typically contains the BSSID could also be modified. Modifying address field 410 prevents duplicates from occurring at legacy receivers because the decryption will fail in this case.

Figure 8:
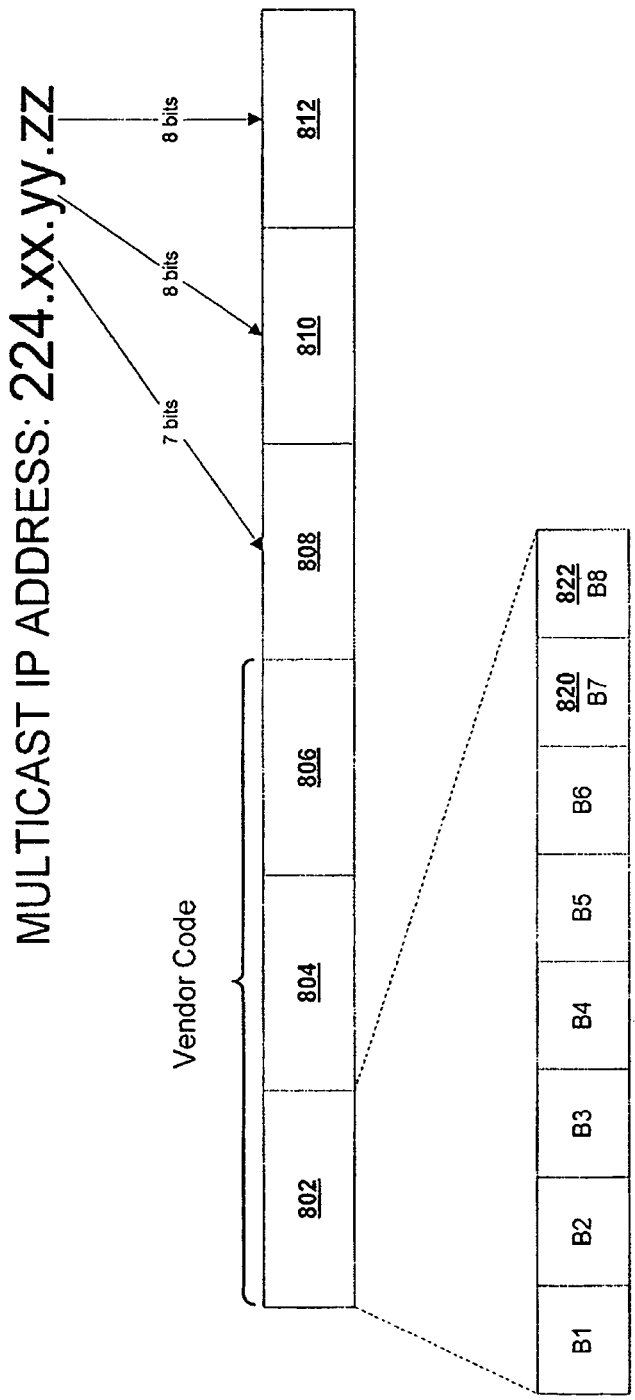
FIG. 8 shows the relationship between the Internet protocol (IP) multicast address and a multicast MAC address.

In the case of the receiver address, the multicast address could be modified. FIG. 8 shows the relationship between an IP multicast address and a multicast MAC address. The lower 23 bits of an IP multicast address are mapped to the lower 23 bits of the corresponding multicast MAC address represented by octets 808, 810 and 812. The upper 24 bits (octets 802, 804, and 806) are designated as a vendor code. For IP multicast, the vendor code is 01-00-5E. For the purposes of this disclosure, the vendor code for a multicast application is referred to as the multicast prefix. Therefore, one possible modification is to alter the multicast prefix to 01-00-5D or 05-00-5E. The non-legacy receiver when seeing a multicast address with the retry field in the control field set to one will recognize the modified multicast prefix and restore the address by changing the prefix back to 01-00-5E when constructing the AAD. The legacy receivers see the modified multicast address because the receiver did not request to receive the multicast address. Even if the receiver forwards the frame to the application, the application would ignore it because the frame was addressed to an unknown multicast address.

Bit 822 is the broadcast bit, which is always set in multicast and broadcast applications. Bit 820 is a locally administered bit, which is not set in BM applications. One specific modification to the multicast prefix is to set the locally administered bit. This would yield a multicast prefix of 03-00-5E. This implies that BM retransmissions can only be applied in situations where the destination address is not locally administered, that is, not in ad hoc networks.

While multicast prefix modification is applicable only to the receiver address 402, modification of the locally administered bits could be applied to the other address field. The BSSID carried in sender address 404 could be modified by setting the locally administered bit. This is a relatively small and harmless change to the address, but the legacy receivers will interpret the transmission as being transmitted by another network, and will therefore not forward it up their stack. A non-legacy receiver will set the locally administered bit to zero before using the sender address field in constructing the AAD. Similarly, the locally administered bit could also be set for source address field 406 provided that the non-legacy receivers set the bit to zero prior to constructing the AAD.

Setting the locally administered bit limits the use of BM retransmissions to infrastructure networks only, because for ad hoc networks (also referred to as an independent basic service set (IBSS)), the BSSID is a locally administered address, rather the MAC address of the access point. However, encrypted multicast streams are not as common in ad hoc networks as, by definition, they have no access points. A non-legacy station in an IBSS must not clear the locally administered bit otherwise the resulting BSSID would no longer be locally administered violating for the use of such address ad hoc BSSID, because when not locally administered the BSSID must conform to specific assignments from a governing body. However, a station knows during its initial association whether it is in an ad hoc network. If it is, it simply does not alter the BSSID.

Modification in other fields can be made and one of ordinary skill in the art can apply the principle of modifying MAC header fields that are components in the AAD for retransmitted BM frames and non-legacy receivers restoring the MAC header fields prior to construction of AAD. The modification of other fields must be taken with care. First the modification needs to be reversible by the receiver, so that the receiver can construct the AAD corresponding to the original BM frame. Second, the modification should not severely alter the meaning of the frame.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

I claim:

1. A method for retransmitting an encrypted broadcast-multicast frame comprising an encrypted frame body and a media access control (MAC) header including a retry subfield having a bit, the method comprising:
   making a modification to one or more fields within the MAC header of the encrypted broadcast-multicast frame, wherein the one or more fields before the modification are included in additional authentication data (AAD) used to generate an encryption key of the encrypted frame body, and wherein the one or more fields with the modification is indicative of a retransmission of the encrypted broadcast-multicast frame; and
   transmitting the encrypted broadcast-multicast frame with the modification to the field and the encrypted frame body;
   wherein the modification can be reversed by a station receiving the encrypted broadcast-multicast frame by recognizing that the modification in the one or more fields indicates that the encrypted broadcast-multicast frame with the modification is the retransmission of the encrypted broadcast-multicast frame, and wherein the station reconstructs the AAD of the original encrypted broadcast-multicast frame by reversing the modification and determines the encryption key of the encrypted frame body based on the reconstructed AAD.

2. The method of claim 1, further comprising setting the bit of the retry subfield of the frame control field.

3. The method of claim 1, wherein the one or more fields is a source address.

4. The method of claim 1, wherein the one or more fields is a destination address.

5. The method of claim 1, wherein the one or more fields is a basic service set identifier (BSSID).

6. The method of claim 1, wherein the one or more fields is an address field comprising a prefix and making a modification comprises modifying the prefix.

7. A method for processing an encrypted broadcast-multicast frame comprising:
   receiving the encrypted broadcast-multicast frame comprising an encrypted frame body and a media access control (MAC) header including a retry subfield having a bit;
   determining if the encrypted broadcast-multicast frame is a retransmission of the encrypted broadcast-multicast frame by recognizing a predetermined modification to one or more fields within the MAC header of the encrypted broadcast-multicast frame, wherein the one or more fields before the predetermined modification are included in additional authentication data (AAD) used to generate an encryption key of the encrypted frame body, and wherein the one or more fields with the predetermined modification is indicative of the retransmission of the encrypted broadcast-multicast frame;
   in response to recognizing the predetermined modification to the one or more fields within the MAC header, reversing the predetermined modification to the one or more fields within the MAC header to reconstruct the AAD of the original encrypted broadcast-multicast frame, and determining the encryption key of the encrypted frame body based on the reconstructed AAD; and
   decrypting the encrypted broadcast-multicast frame after the reversing of the predetermined modification to the one or more fields within the MAC header.

8. The method of claim 7, further comprising determining if the bit of the retry subfield of the frame control field is set.

9. The method of claim 7, wherein the one or more fields is a source address.

10. The method of claim 7, wherein the one or more fields is a destination address.

11. The method of claim 7, wherein the one or more fields is a BSSID.

12. The method of claim 7, wherein the one or more fields is an address field comprising a prefix and the predetermined modification comprises a modification to the prefix.

13. An access point configured for retransmitting an encrypted broadcast-multicast frame comprising an encrypted frame body and a media access control (MAC) header including a retry subfield having a bit, the access point comprising:
   a processor;
   a wireless network interface device; and
   a memory comprising instructions;
   the instructions causing:
      the processor to make a modification to one or more fields within the MAC header of the encrypted broadcast-multicast frame, wherein the one or more fields before the modification are included in additional authentication data (AAD) used to generate an encryption key of the encrypted frame body, and wherein the one or more fields with the modification is indicative of a retransmission of the encrypted broadcast-multicast frame; and
      the wireless network interface device to transmit the encrypted broadcast-multicast frame with the modification to the field and the encrypted frame body;
      wherein the modification can be reversed by a station receiving the encrypted broadcast-multicast frame by recognizing that the modification in the one or more fields indicates that the encrypted broadcast-multicast frame with the modification is the retransmission of the encrypted broadcast-multicast frame, and wherein the station reconstructs the AAD of the original encrypted broadcast-multicast frame by reversing the modification and determines the encryption key of the encrypted frame body based on the reconstructed AAD.

14. The access point of claim 13, wherein the instructions further cause the processor to set the bit of the retry subfield of the frame control field.

15. The access point of claim 13, wherein the one or more fields is a source address, a destination address, a BSSID or a combination thereof.

16. The access point of claim 13, wherein the one or more fields is an address field comprising a prefix and the instructions cause the processor to make the modification to the field by modifying the prefix.

17. The access point of claim 13, wherein the access point retransmits the encrypted broadcast-multicast frame to a station, the station comprising:
   a processor;
   a wireless network interface device; and
   a memory comprising instructions;
   the instructions causing the wireless network interface device to receive the encrypted broadcast-multicast frame comprising the MAC header; and causing the processor
      to determine if the encrypted broadcast-multicast frame is the retransmission of the encrypted broadcast-multicast frame by recognizing the predetermined modification to one or more fields within the MAC header of the encrypted broadcast-multicast frame, wherein the one or more fields before the predetermined modification are included in additional authentication data (AAD) used to generate the encryption key of the encrypted frame body, and wherein the one or more fields with the predetermined modification is indicative of the retransmission of the encrypted broadcast-multicast frame;

if the encrypted broadcast-multicast frame is the retransmission, to reverse the predetermined modification to one or more fields within the MAC header to reconstruct the AAD of the original encrypted broadcast-multicast frame, and to determine the encryption key of the encrypted frame body based on the reconstructed AAD; and to decrypt the encrypted broadcast-multicast frame if the encrypted broadcast-multicast frame has not already been received.

18. A station comprising:
a processor;
a wireless network interface device; and
a memory comprising instructions;
the instructions causing the wireless network interface device to receive an encrypted broadcast-multicast frame comprising an encrypted frame body and a media access control (MAC) header including a retry subfield having a bit; and causing the processor:
to determine if the encrypted broadcast-multicast frame is a retransmission of the encrypted broadcast-multicast frame by recognizing a predetermined modification to one or more fields within the MAC header of the encrypted broadcast-multicast frame, wherein the one or more fields before the predetermined modification are included in additional authentication data (AAD) used to generate an encryption key of the encrypted frame body, and wherein the one or more fields with the predetermined modification is indicative of the retransmission of the encrypted broadcast-multicast frame;

in response to recognizing the predetermined modification to the one or more fields within the MAC header, to reverse the predetermined modification to the one or more fields within the MAC header to reconstruct the AAD of the original encrypted broadcast-multicast frame, and to determine the encryption key of the encrypted frame body based on the reconstructed AAD; and to decrypt the encrypted broadcast-multicast frame after reversing the predetermined modification to the one or more fields within the MAC header.

19. The station of claim 18, wherein the processor determines if the bit of the retry subfield of the frame control field is set.

20. The station of claim 18, wherein the one or more fields is a source address or a destination address or a BSSID.

21. The station of claim 18, wherein the one or more fields is an address field comprising a prefix and the predetermined modification comprises a modification to the prefix.

* * * * *